April 25, 1933.  R. M. CRITCHFIELD ET AL  1,906,047
WINDSHIELD CLEANER
Filed Feb. 20, 1929  4 Sheets-Sheet 1

Inventors
Robert M. Critchfield
and
John W. Lawson
By Spence, Hardman & Fehr
Their Attorneys April 25, 1933.    R. M. CRITCHFIELD ET AL    1,906,047
WINDSHIELD CLEANER
Filed Feb. 20, 1929    4 Sheets-Sheet 3

Fig. 8

Inventors
Robert M. Critchfield
John W. Lawson
By Spencer, Hardman & Fehr
Their Attorneys April 25, 1933.  R. M. CRITCHFIELD ET AL  1,906,047

WINDSHIELD CLEANER

Filed Feb. 20, 1929   4 Sheets-Sheet 4

Inventors
Robert M. Critchfield
and
John W. Lawson
By Spencer, Hardman & Fehr
Their Attorneys Patented Apr. 25, 1933

1,906,047

UNITED STATES PATENT OFFICE

ROBERT M. CRITCHFIELD AND JOHN W. LAWSON, OF ANDERSON, INDIANA, ASSIGNORS TO DELCO-REMY CORPORATION, OF ANDERSON, INDIANA, A CORPORATION OF DELAWARE

WINDSHIELD CLEANER

Application filed February 20, 1929. Serial No. 341,489.

This invention relates to windshield cleaners and particularly to dual devices of this class which may be automatically operated, and it is one of the objects of the invention to provide a windshield cleaning construction employing two separate cleaning elements, both of which may be positively operated.

Another object of the invention is to provide an automatic stop mechanism, which will insure that the cleaning mechanism will always come to rest at one and the same position.

Another object of the invention is the provision of mechanism which, though inaugurated at an intermediate point of the cycle of operation, will not become effective to produce a secession of operation until the mechanism has come near the end of its cycle of operation.

Another object of the invention is the provision of means stopping the operation of the mechanism by predetermined movement of a portion of said mechanism.

Another object of the invention is the provision of means for preventing the mechanism from coasting beyond a certain point after secession of the operation has been inaugurated.

Another object of the invention is to provide means for shifting the wiping mechanism of the device to a parking position, or out of the general line of vision, when not to be used for cleaning of the windshield.

Another object of the invention is to provide for stopping of the wiper at the end of the stroke regardless of the coasting distance of the motor.

Another object of the invention is to provide for housing the operating structure within the body of the vehicle, and under the instrument board of the drivers compartment.

Another object of the invention is to mount the operating structure of the windshield cleaner under the cowl of the vehicle so as to present a more sightly appearance of the fittings about the windshield.

Another object of the invention is to more adequately protect the operating mechanism of the windshield cleaner from foreign matter and weather elements.

Further objects and advantages of the present invention will be apparent from the following description, reference being had to the accompanying drawings wherein a preferred embodiment of one form of the present invention is clearly shown.

In mechanisms of this class it has commonly been the practice to mount the windshield wiper and the motion translating mechainsm therefor outside of the vehicle body, and under the visor near the top rail of the windshield. This form of structure presents rather unsightly appearance, which is contrary to the present trend of automobile design. Aside from being unsightly, this method of construction exposes the power elements and driving instrumentalities to all the dust, dirt and weather elements that the vehicle may encounter, all of which materially effect the efficiency of operation and the longevity of the device.

In overcoming these undesirable features we have provided a novel construction in a windshield cleaning device which we have mounted within the vehicle body, preferably under the cowl and behind the instrument board where the device is protected from all deleterious elements, yet is entirely out of sight except for the wiping arms on the outside of the windshield. We have also discovered that the wiping arms of the mechanism may be moved from the normal working position, in which they move over the surface of the windshield in the usual manner, to a position entirely without the windshield field of vision and we have therefore provided means for moving the wiping elements from the working position to the non working, or parking position as we have termed it. We have further discovered that the wiping mechanism may be caused to stop at a certain point in its cycle of movement, irrespective of the part of the cycle at which the stopping function is inaugurated, and we have therefore provided means for insuring that the wiping mechanism will always be stopped at the same point in its cycle of movement.

Heretofore it has been the practice to insert a manual energy controlling means between the wiping mechanism and the driving instrumentalities, for stopping and starting the operation of the cleaning mechanism, but in the instant structure these parts are reduced to a minimum, and provision is made for actuating the energy controlling means by a predetermined or preordained movement or manipulation of the parts of mechanism so controlled.

These features are particularly desirous and contribute materially to present day automotive engineering, in that they add to the safety element marking for the benefit of the operator. By the predetermined point of stoppage, the movement of the wiper to the parked position will insure that the wiping arms of the mechanism will always stop at a point in their cycle of movement, and be disposed at a point where they will offer the least obstruction to the field of vision before the operator.

With particular reference to the drawings, 20 represents the lower rail of the windshield, or transverse member across the body of the vehicle usually found at the front of the operator's compartment, and in this instance provides a support for the windshield cleaning mechanism as will presently appear. As is the usual practice the rail 20, is provided with a weatherstrip or meeting elements 21, having an interlocking or seating engagement with the rail 20, as by means of the dovetail web 22, received within a similarly shaped groove of the rail 20, and further provides the channeled flange 23 cooperating with the windshield glass 24 for ventilating means, as is common in the art. Upon the engine side of the rail 20, the cowl member 25 is joined thereto, and on the opposite side of the rail 20 the instrument panel 26 may be secured as by means of the screws 27, or any other preferred means.

Upon the rail 20 there is mounted the bed plate 30, by means of screws 31 driven through the plate and into the rail 20. The bed plate 30 provides a shifting support for the windshield driving motor and transmission mechanism. In addition to the crews 31, the bed plate 30 threadably receives the stud screws 32, which are loosely received by slots 33 in the motor mounting brackets 34 and 35. The studs 32 also carry helical springs 36, and a washer 37 disposed between the head of the screw 32 and the slotted end of the motor mounting brackets, and a bearing washer 38 between the motor mounting bracket and the bed plate 30. This construction provides a resilient, yet firm support for the motor mounting brackets 34 and 35 and permits movement thereof upon the bed plate 30. The motor mounting brackets 34 and 35 are each formed with an upturned flange 39, which provides means for attaching to the driving motor and associated instrumentalities, as by means of the screws 40.

The driving motor 50, in the present instance is an electric motor affixed at one end to a gear casing 80, which with the inclosed transmission mechanism are shiftably supported on the bed plate 30 by the motor mounting brackets 34 and 35. The motor is provided with motion translating instrumentalities provided with a driving shaft 85, extending through the rail 20. Here the motion translating instrumentalities have an operative engagement with the wiping shafts of the mechanism, positioned in the member 20 at points spaced laterally of the drive shaft 85, and tends to translate the motion of the motor to the wiper shafts.

The driving motor 50 comprises the U-shaped magnetic frame 51, the legs of which are connected with the bridge or intermediate portion 52, supporting the motor brush carriers 53 and 54. The bridge 52 provides an end bearing 55 for the rotor shaft 56 of the motor. In one leg of the magnet frame 51 there is mounted a pole core 57 which supports the pole winding 58 and the pole shoe 59. The opposite leg of the magnet frame is deformed to provide the pole piece 60, all of which appears in the illustration of Fig. 3.

Each of the motor brush carriers 53 and 54, are pivotally and insulatingly mounted upon the bridge piece 52 of the magnet frame by means of the collared or flanged pins 61 and 62 respectively, each supported by the insulated bushings 63 and washers 64. The pin 61 also carries a plane washer 65, a lock washer 66 and a clamping nut 67, which when threaded onto the threaded end of the pin 61 tend to securely hold the pin 61 in place upon the bridge piece 52. In order to be utilized as the binding post, the pin 61 is further provided with a lock washer 68 and a clamping nut 69. The pin 62 terminates beyond the bushing 63 in a peened head 70 turned over against the washer 65.

Each of the motor brush carriers 53 and 54, are provided with a contact block 71 arranged to contact the commutator 72 of the rotor 73, and are kept in engagement therewith by means of the spring 74, anchored to spring holders 75 received in apertures 76 of each brush holder. The spring 74 tends to keep the brush carriers 53 and 54 seated upon, and in contacting engagement with their respective pivot pins 61 and 62. Each of the brush holders 53 and 54 are provided near their pivotal ends with a terminal attaching tab 77, to which the leads of the various electrical connections are made.

To the free ends of the magnet frame 51 there is attached the gear housing 80, as by means of the screws 81 driven through each leg of the magnet frame and into the body of the housing 80. The housing 80, in addition to providing means for connection with the magnet frame 51, contain a substantial part of the motion translating mechanism, and provides a second bearing 82 for the motor shaft 56. On the extended end of the shaft 56 a worm thread 83 is provided which has engagement with a worm wheel 84 fixed to the driving shaft 85, journalled in the hollow boss 86.

The motor shaft 56 is provided with a ball thrust bearing 87, supported by the bridge portion 52 of the magnet frame, and with an adjustable thrust bearing at the opposite end by means of the set screw 88, and lock nut 89 cooperating with the part of the housing 80 adjacent the crowned end of the motor shaft 56. These bearings insure proper adjustment of the motor within its bearings and provide a means of reducing to a minimum motor operating noises, usually found in such devices.

Figure 8:
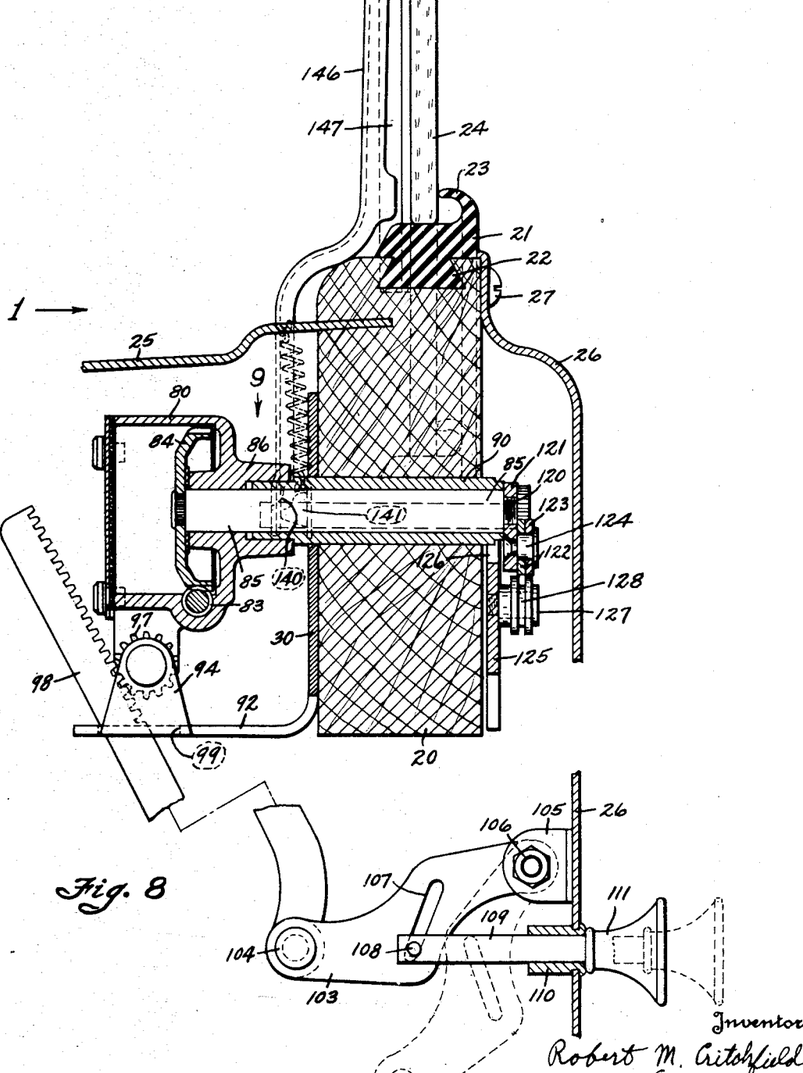
Fig. 8 is a section through the gear housing and transmission mechanism taken along the line and in the direction of the arrows 8—8 of Fig. 3, certain parts however, moved to a different position, to illustrate the mechanism in an intermediate running position.
Figures 9, 10:
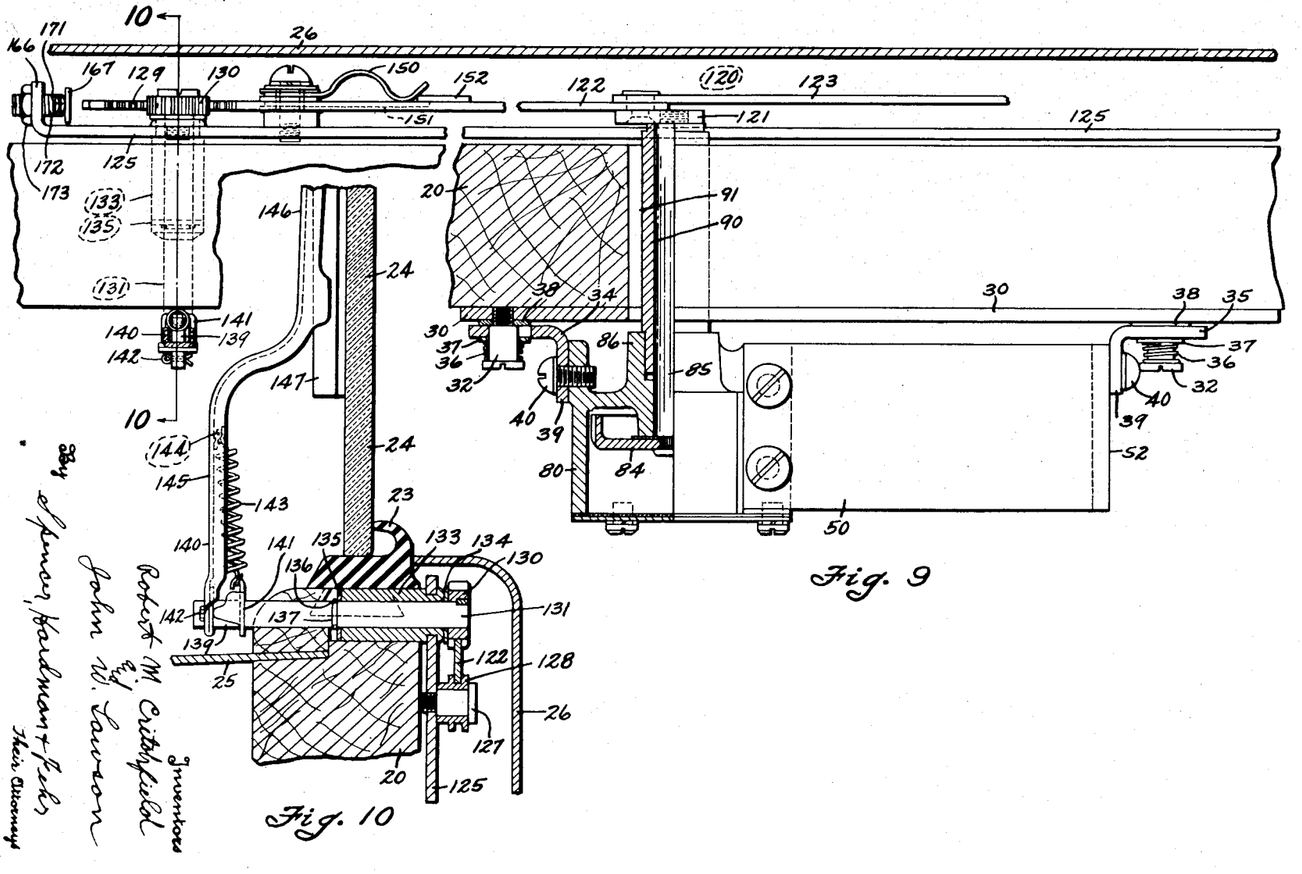
Fig. 9 is essentially a plan view of the device, certain parts being shown in section, and is taken in the direction of arrow 9, in Fig. 8; the figure showing the mechanism adjusted to the running position.
Fig. 10 is a section through Fig. 9 on the line 10—10 and shows the wiping mechanism at a point intermediate the extreme of its working limits.

It will be noted from Figs. 8 and 9, that the hollow boss 86 projects both inwardly and outwardly from the wall of the housing 80, and in addition to providing a bearing for the shaft 85 also provides means for receiving the end of the sleeve 90 which houses the extended portion of the shaft 85. The gear housing 80, and the attached motor 50 have provision for engagement with the mounting brackets 34 and 35, as has been earlier stated, and it is clear from the illustration of Figs. 3 and 9 that the screws 40 are driven through the apertured arms 39 of the said brackets, and are threadedly received in appropriate portions of the members 80 and 52.

From all of the description that has preceded it is obvious that the driving motor and the motion translating mechanism may be shifted on its mount, that is upon the bed plate 30 to the extent permitted by the slots 33 in the brackets 34 and 35, and the studs 32. The shaft 85 and the enclosing sleeve 90, are extended sufficiently beyond the housing 80 from the boss 86, that they protrude entirely through the rail 20 to the opposite side thereof, and consequently provision is made by enlarging the aperture 91 through the rail 20 sufficiently to allow lateral shifting of the shaft 85 and sleeve 90, a distance equivalent to the shifting permitted by the brackets 34 and 35 on the studs 32.

Means are provided for shifting the motor and the motion translating mechanism within these elongated openings in the following manner. The bed plate 30 is provided with an upstanding lug 92 having the parallel ears 93 and 94, which provide a support and bearings for an adjusting screw 95. The adjusting screw 95 is provided with a double thread on the main portion which cooperates with a similarly threaded lug 96, formed on a part of the housing 80. The screw 95 terminates at one end in a pinion 97 adapted to engage and be operated by a rack bar 98, movable through an aperture 99 in the lug 92. Each end of the adjusting screw is provided with pivot bearing as at the pyramidal embossment 100 of the ear 94, and the pyramidal pointed screw 101 adjustably received in the ear 93. This means of supporting the adjusting screw 95 provides practically frictionless bearings for the shifting screw, one of which is adjustable, since the screw 101 may be run in and out of ear 93 and locked in the desired position by means of the clamping nut 102. The rack bar 98 is pivotally connected to a link or lever 103 at 104, which is pivotally supported upon the instrument panel 26 as by means of the bracket 105 and the bolt and nut device 106.

The link 103 is provided with a slot 107 which cooperates with a pin 108 in a reciprocating member 109, mounted in a bushing 110, secured to the instrument panel 26, exterior of which the member 109 is provided with a manual control 111.

From this description, it is obvious that manipulation of the button 111, will work through the parts associated therewith to reciprocate the rack bar 98 within the slot 99 of the bracket 92, and in doing so will cause the pinion 97 to rotate upon its bearings. Upon this rotary motion of the pinion 97, and consequently of the double threaded screw 95, the motor 50 with its attached motion translating mechanism, will be moved from one extreme to the other of the shiftable connections hereinbefore described.

Rotary motion of the shaft 85 is translated to an oscillating movement of the wiping mechanism, by mounting upon the threaded extension 120 of the shaft 85, a driving arm or link 121, which provides a crank for driving the rack bars 122 and 123. The rack bars are fixed to the crank 121 by means of a shouldered pin 124 pivotally supporting the rack bars on the said crank arm, and secured within the crank 121.

On the opposite side of the rail 20 on which the driving motor is fixed, the supporting bracket or carriage 125 is mounted which provides bearings for the wiping mechanism, maintains the wiping mechanisms in spaced relation with the driving shaft 85, and with each other, and provides a guide and support for the remainder of the motion translating instrumentalities. At the central part of the bracket 125, it is cut away or otherwise formed as at 126, to eliminate any interference when shifting the driving mechanism.

Figures 3, 4, 5, 6, 7:
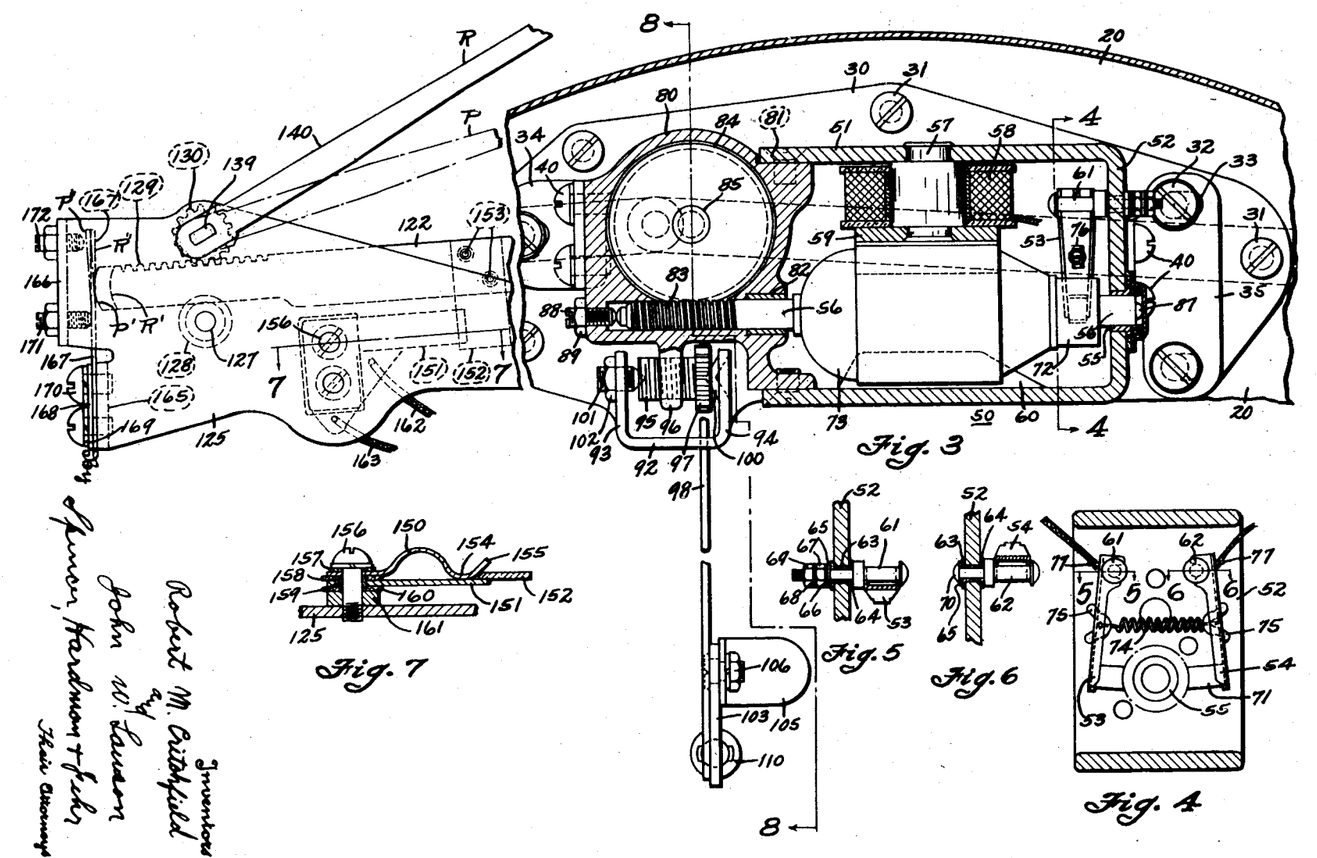
Fig. 3 is an enlarged view of the cleaning mechanism, with certain parts broken away to show a section thereof, said sectional portion of the view being substantially as that indicated on the line 3—3 of Fig. 2, the figure in main representing the structure in the running position.
Fig. 4 is a section through the driving motor as appears along the line and in the direction of the arrows 4—4 of Fig. 3.
Figs. 5 and 6 are details of the brush mountings, and are sectional views as represented by the lines 5—5 and 6—6 of Fig. 4.
Fig. 7 is a detail of the circuit controller, and is taken substantially on the line and in the direction of the arrows 7—7 of Fig. 3.

Each end of the bracket 125 is especially provided with means for supporting and guiding one end of the rack bars 122 and 123 hereinbefore referred to, and embody a shouldered stud 127 fixed to the bracket and rotatably supporting a flanged idler 128, which forms an anti-friction bearing for the remote end of the rack bars 122 and 123 as will be noted upon reference to Figs. 3, 8 and 10. The remote end of the rack bars 122 and 123, are provided with the teeth 129 which cooperate with a pinion 130 fixedly mounted upon the wiper shaft 131 as by means of the key 132. The wiper shaft 131 is journalled within the tubular bearing or sleeve 133 permanently mounted on the bracket 125 in spaced relation with respect to the idler mechanism just described, so that the rack bars when riding within the groove of the idler 128, will be disposed with the teeth thereof in engagement with the teeth of the pinion 130.

In mounting the wiper shaft 131 within the sleeve 133, the spacing and friction washer 134 is placed between the pinion 130 and the end of the sleeve 133, and a friction washer 135 is placed over the shaft 131 after passing through the sleeve 133, so as to provide end bearings for the pinion 130, and a spring retaining ring 136 seated in an annular groove 137 in the shaft 131. The shaft 131 is of sufficient length to extend substantially beyond the sleeve bearing 133, through the remaining portion of the rail 20, and to receive or drivingly mount the wiping mechanism which operates over the glass of the windshield. The terminal or driving end of the shaft 131, is provided with the flattened or non-rounded portion 139 which drivingly engages the wiping arm 140, and a spring clip 141 retained thereon by means of the cotter pin 142. A biasing spring 143 is attached to the clip 141 and to a wiping arm 140 as at 144 which tends to urge the wiping arm 140 against the windshield glass 24.

The wiping arm 140 is provided with a relatively long shank portion 145 and thence bent sharply to form an offset arm 146 supporting and guiding the wiping blade 147. This formation of the arm 140 is made in order that clearance may be provided for the protruding portion of the windshield rail 20, and allow the wiping mechanism to be parked close to the edge of the windshield glass.

From the description thus far, it is obvious that as soon as the electric motor is energized, that due to the train of motion transmitting instrumentalities that the rotation of the motor shaft will be translated, by reason of the shaft 85, the crank 121, the rack bars 122 and 123 and the pinions 130, to an oscillating movement of the wiping arms 140, thus enabling the windshield to be cleaned of objectionable deposits thereon. It will be seen that a shifting movement of the driving mechanism will likewise result in a shifting movement of the rack bars 122 and 123, that is, when the driving mechanism is shifted to the right or left as viewed in Figs. 1, 2, 3 and 9, then the rack bars 122 and 123 will likewise be shifted an equal amount.

The shifting of the mechanism is adapted in one instance, to control the energy source connected to the driving motor for operating the motion transmitting instrumentalities, and in another instance, to determine a point at which the mechanism may be stopped in its cycle of movement. The energy controlling means is embodied in a pair of contacts 150 and 151 mounted upon the bracket 125, engageable under certain conditions, by an actuator 152 mounted upon one of the rack bars. Both of the contacts 150 and 151 are substantially of L-formation being formed from sheet material, the contact 150 being additionally formed to provide a springing leaf which includes a contact point 154, and the offset canting lip 155, which when disposed adjacent the end of the contact 151 provide an entry means for the separating element 152. The contacts 150 and 151 are insulatingly mounted with respect to one another, and the contact 151 with respect to the supporting bracket 125, by means of the screws 156 engaging an oblong washer 157, then passing through the contact 150, thence through the insulating washer 158, sleeve 159 which insulatingly supports contact 151. Against the contact 151, and over the sleeve 159 there is placed the non-conducting washer 160. Thence the screws 156 are passed through the spacing washer 161 and threaded into the bracket 125. Each of the contacts 150 and 151 are provided with leads, as 162 and 163 respectively for the appropriate connections into the circuit of the device. By this construction it will be seen that the contact bracket 151 is insulatingly supported with respect to the contact 150, and the screws and support by which it is mounted.

The actuating element 152 is of non-conducting material and is mounted upon the rack bar 122 by screws 153, in such a position that when the mechanism is in one extreme of its shifted position that the element 152, as it is carried by the bar 122 in its reciprocable movement to actuate the pinion 130, will be free of engagement with the contact elements 150 and 151, and so that when the mechanism is shifted to the other extreme that the element 152 will be caused at a certain point in the cycle of movement of the bar 122, to engage between the ends of the contact springs 150 and 151.

From the description of this structure, and the illustration in the drawings, it is seen that the current or energy led to the contacting elements 150 and 151, may be controlled by shifting of the driving motor or the instrumentalities connected thereto, since the shifting movement will determine whether or not the actuating element 152 will be caused to engage the contacting elements to open or close the circuit therethrough. Thus, to start the device, the controller member 111 is operated so as to shift the mechanism to the right as viewed in Figs. 1, 2, 3 and 9, which will cause the member 152 to be disengaged from the contacts 150 and 151, allowing them to spring together substantially as indicated in Fig. 7, so that the circuit may be completed therethrough which will cause the motor to be energized and drive the motion transmitting instrumentalities.

During the operation of the device the rack bars 122 and 123 will be reciprocated, or substantially so, and the extent of this reciprocable movement will be confined to limits such that the actuating element 152 will not actuate the contact elements 150 and 151, to open the circuit therethrough, but will only approach the relation as indicated in Fig. 7, so that as long as the mechanism remains shifted to this position, operative relation will be maintained and the apparatus continue to function. When the apparatus is shifted to the other extreme, or to the stopping position, then the actuating element 152 will engage the contacts 150 and 151 near the end of the stroke of the wiper mechanism, so as to open the electrical circuit therethrough and deenergize the motor. Due to the train of mechanism, and the speed with which the motor runs the mechanism would normally continue to operate or coast for a portion of a wiping cycle, but in the present instance means are provided for preventing the coasting of the mechanism, so as to insure that the wiping elements will always be stopped in the same relative position irrespective of the point in the cycle of operation at which the energy circuit is interrupted.

The coasting effect of the mechanism is overcome, by providing the bracket 125 with the upstanding lugs 165 and 166, which function to support a buffer mechanism engageable with one of the rack bars when it is shifted to the stop position. Mounted upon the lug 165 there is a buffer spring 167 which is clamped thereto by means of a long washer 168 disposed between the spring 167 and a pair of lock washers 169, and secured to the bracket by clamping screws 170 threaded into the lug 165. It will be noted from the illustration in Fig. 3, that the lug 165 is at the lower portion of the bracket 125 or offset from the bracket 166 and provides for the extension of the spring 167 into the path of movement of the rack bar 122. The lug 166 supports a pair of tension adjusting screws 171 and 172, threaded through the lug 166 held in locking relation thereto by the nuts 173.

The adjusting screws 171 and 172 provide a means of adjusting the tension of the spring 167 to meet the various requirements as determined by the ratio of the gear mechanism, and the power of the motor. In each instance these elements are so associated with the bracket 125 and the rack bar by which they would be engaged, or with which they would cooperate that when the mechanism is shifted to the running position the rack bar 122 will be free of engagement with the spring 167, but as soon as the mechanism is shifted to the stop position and before the rack bar 122 approaches the end of its cycle of movement to the left, as viewed in Fig. 3, that the end of the rack bar 122 will engage the spring 167 which will tend to restrain the mechanism from further operative movement. When the mechanism has been mounted upon the vehicle the parts are so adjusted that this effect will be produced, and so that the mechanism will always stop in the same relative position or at the same point in its cycle of movement.

In the drawings Fig. 8 illustrates in main the running position of the mechanism, but also for the sake of clearness illustrates certain parts of the apparatus in other relations. The full line showing of the wiper arm 140 represents one extreme of the running position, and is indicated generally by the letter R. The position to which the arm is moved when the mechanism is stopped, in which the arm is parked close to the edge of the windshield is indicated generally at P. Likewise, one extreme of the movement of the rack bar 122 is indicated as in the running position at R', and at the parking position as at P'. Similarly the two positions of the spring 167 are indicated at R" and P" respectively.

In the operation of this mechanism, once that it has been assembled on the vehicle and properly adjusted, when it is desired to start the mechanism in its operation, the control element 111 is pulled outwardly from the instrument board 126, which causes the rack bar 98 to actuate the shifting screw 95, which in turn will shift the motor and transmission mechanism toward the right as viewed in Figs. 1, 2, 3 and 9, so that the actuating element 152 will be withdrawn from between the contacts 150 and 151. This allows the circuit to be completed through the contacts which will energize the motor causing it to drive the motion transmitting mechanism, by which the rack bars 122 and 123 will be reciprocated between the idler 128 and the pinion 130. This reciprocation of the rack bars is translated to an oscillatory movement of the wiping arm 140 and consequently the blade attached thereto which operates to clean the surface of the windshield.

Figures 1, 2:
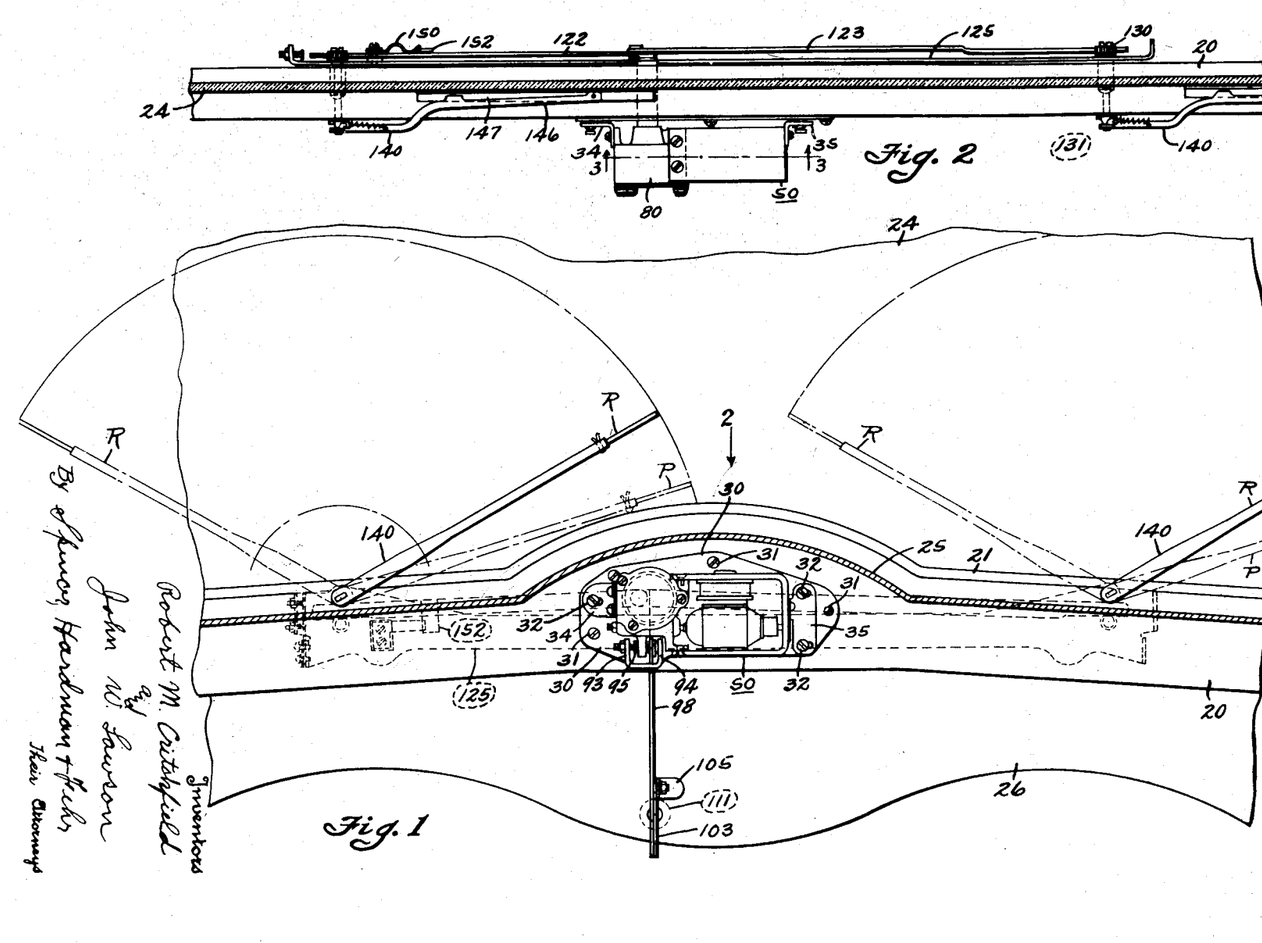
Fig. 1 is an elevation of the improved windshield cleaner as applied to the instrument board of an automotive vehicle, the view being taken from a point on the engine side of the instrument board substantially as indicated by the arrow 1 of Fig. 8.
Fig. 2 is a plan view of the same taken in the direction of the arrow 2 of Fig. 1.

During this operation the rack bars 122 and 123 move the arms 140 over the surface of the windshield 24, as defined by the limits R, R in Figs. 1 and 8, and the rack bar 122 moves to the left only so far as indicated at R'. While in this shifted position the actuating element 152 will not open the circuit through the contacts 150 and 151, nor will the rack bar 122 engage the buffer spring 167.

When it is desired to stop the mechanism the control button 111 is pushed inwardly to the full line position as indicated in Fig. 8, which, through the mechanical connection herein described shifts the motor and the motion translating mechanism to the left as indicated in Figs. 1, 2, 3 and 9. In this position the actuating element 152 is conditioned to inaugurate an opening of the circuit through the contacts 150 and 151. After the element 111 has been manipulated to stop the mechanism the motor may make a number of revolutions before it is actually stopped, and this number of revolutions will vary according to the point in the cycle of the operation of the mechanism at which the stopping of the mechanism is instituted. For instance, the button 111 may be manipulated to stop the mechanism when the wiping arm 140 is at one end of the stroke, or it may be when the wiping arm is at an intermediate point in a stroke.

It is however, immaterial where the stopping of the mechanism is instituted, or in other words at what point in the cycle of operation where it is desired to shift the motor and the associated mechanism for stopping, for the motor will continue to drive the motion instrumentalities until the element 152 opens the circuit through the contacts 150 and 151. From that instant on the actual stopping of the mechanism begins to take place, for it is at that point that the energy source is disconnected from the driving motor. Due to the speed at which the motor is driven and the gearing between it and the wiping arm, the mechanism continues to operate for a very short time during which the apparatus is brought to a standstill in the desired position.

Now enter in the features of the buffer mechanism, for in the shifted position in which the motor and the motion transmitting instrumentalities are moved to the left of the figures as described, the rack bar 122 and the spring 167 are in such close juxtaposition that when the rack bar 122 moves to the left hand extreme of its running position, or that position indicated by P', the rack bar 122 will then engage the spring 167 which will restrain it from further movement toward the left. This in effect, will operate as a brake upon the mechanism with sufficient force to bring the parts to rest, substantially at or just before, the crank element 121 and pin 124 reach dead center. The association and the adjustment of these structure elements account for stopping the mechanism always in the same point in its cycle of movement, and provide for moving the wiping arms from the running position to the parking position, whenever the mechanism is stopped in its operation.

From the foregoing it will be seen that we have devised a structure particularly adaptable to be mounted within the automobile body enclosure, with means for controlling the operation of the mechanism by a predetermined movement or shifting of the mechanism itself. Further, a structure has been devised by which the wiping mechanism is automatically stopped at the end of a stroke, and in which the wiping arms are always moved to a parking position at the end of the operation of the device, so that the field of vision before the operator is always clear of obstruction.

While the form of embodiment of the present invention as herein disclosed, constitutes a preferred form, it is to be understood that other forms might be adopted, all coming within the scope of the claims which follow.

What is claimed is as follows:

1. In a windshield cleaner, a wiper shaft, motor driven instrumentalities connected with said wiper shaft, a motor for driving said instrumentalities, said instrumentalities including a rack bar, a bracket supporting said rack bar, contact elements supported on said bracket, and normally in circuit closing relation, means on said rack bar for actuating said contact elements to circuit open and circuit closed relation, upon predetermined movements of said rack bar.

2. In a windshield cleaner, a wiper shaft, motor driven instrumentalities connected with said wiper shaft, a motor for driving said instrumentalities, circuit controlling means and an actuator therefor, a bracket shiftably supporting said motor, and means to shift the motor on said bracket, said actuator operable upon manual shifting movement of said motor to actuate said circuit controlling means.

3. In a windshield cleaner, the combination comprising, a driving motor, means shiftably supporting said motor, wiper mechanism carried by said supporting means, motor driven instrumentalities connecting said motor and wiper mechanism, motor stopping means supported by said means and in the path of a part of said instrumentalities but normally out of engagement therewith, buffer mechanism on said supporting means in the path of said instrumentalities but normally out of engagement therewith, and means for shifting said motor and instrumentalities for engagement with said motor stopping means and said buffer mechanism, whereby said instrumentalities will be arrested at a predetermined point in the cycle of their movement.

4. In a windshield cleaner, the combination comprising, a driving motor, means shiftably supporting said motor, wiper mechanism carried by said supporting means, motor driven instrumentalities connecting said motor and wiper mechanism, circuit closing means carried by the supporting means and so located as to be out of engagement of a movable part of said driving instrumentalities in one position of said motor, and engageable by a moving part of said instrumentalities upon shifting of the motor from said position.

5. In a windshield cleaner, the combination comprising, a driving motor, a wiper mechanism, transmission mechanism connecting the same, means supporting said motor transmission mechanism and wiper, and means for manually shifting said motor and mechanism, said supporting means carrying a circuit opening device cooperable with said transmission mechanism when shifted for stopping said motor and transmission mechanism.

6. In a windshield cleaner, the combination comprising, a driving motor, a wiper mechanism, transmission mechanism connecting the same, means supporting said motor, transmission and wiper mechanism, buffer means carried by the supporting means and adapted to be engaged by a part of the transmission mechanism, for resisting coasting of said motor and mechanisms, and means for shifting the transmission mechanism to and from the buffer means, whereby the same will be engaged and not engaged by the said mechanism.

7. The combination with a windshield and a motor operated wiper mechanism therefor, comprising, a member supporting said windshield and said wiper mechanism, the driving motor thereof being shiftably mounted upon said supporting member, motor control means on said support positioned for engagement with instrumentalities driven by said motor, buffer mechanism upon said support for engagement with said instrumentalities, and means for shifting said motor into and out of engaging relation with said motor control means and said buffer mechanism, whereby said mechanism may be started and stopped at a preordained point in its cycle of movement.

8. In combination, a driving motor, a bed plate shiftably mounting said motor, a support for said bed plate, wiper mechanism journalled in said support, transmission mechanism connecting said driving motor and said wiper mechanism, contacts mounted on said support, control means on said support for shifting said motor on said bed plate and said transmission mechanism on said support, means on said transmission mechanism engageable with said contacts for controlling the circuit therethrough upon shifting of said transmission mechanism.

9. In combination, a driving motor, a bed plate shiftably mounting said motor, a support for said bed plate, wiper mechanism journalled in said support, transmission mechanism connecting said driving motor and said wiper mechanism, means for shifting said motor upon said bed plate, and means upon said support engageable by said transmission mechanism for controlling the operation of said motor, upon shifting of the same.

10. In a windshield cleaner, the combination comprising, a wiper mechanism including a wiper arm, means driving said mechanism, means for stopping said mechanism only when the wiper reaches the end of a stroke, and means operable coincident with stopping the mechanism for moving said wiper arm to a position beyond its wiping range.

11. A windshield cleaner comprising in combination, means for wiping the windshield, means for driving said wiping means over a normal range of said windshield, means to shift the driving means, so as to drive the wiping means to a position beyond the normal range of movement, and means to cause the wiper to stop when it has arrived at the said position.

12. In a windshield cleaner, wiper mechanism and driving means therefor, means supporting said mechanism and said driving means, and energy controlling means operable by a predetermined cooperation of said driving means and supporting means for starting and stopping said wiper mechanism, said controlling means being actuated by predetermined manipulation of the driving means.

13. In a windshield cleaner, a wiper mechanism and a driving motor therefor, transmission means connecting said wiper mechanism and driving motor, supporting means for said transmission means, said motor and transmission means being bodily movable on said support, energy controlling means for said motor carried by the support, and an actuator therefor carried by the transmission means, said energy controlling means being actuated by the actuator upon predetermined relative movement of said motor and supporting means for stopping and starting said wiper mechanism at a foreordained point.

14. In a windshield cleaner, a wiper mechanism, a motor driving said mechanism through a definite cycle of movement, means for controlling the operation of said motor and mechanism, means for actuating the controlling means, and a hand button for manipulation of the actuating means, said controlling means being situated just out of engagement from said actuating means by said mechanism when the same is driven through its definite path of movement, and said hand button operable to cause the mechanism to be driven in a new path whereby the controlling means will be actuated by said actuating means so as to stop the wiper mechanism only near the end of its new path, irrespective of where the stopping of said mechanism is instituted.

15. A wiper, an electrical wiper operating mechanism, a control switch, a member moved by the mechanism for operating the switch, and means for producing relative movement bodily between the mechanism and the switch so that the switch may remain closed or may be opened by the mechanism at the end of a wiper stroke.

16. In a windshield cleaner, the combination comprising, wiper mechanism, a driving motor, motion translating mechanism connecting said motor with the wiper mechanism, means optionally engageable by a part of said motion translating mechanism for starting and stopping said motor, and means to control the optional engagement, said translating mechanism and starting and stopping means when controlled for stopping, cooperating to stop the motor only at the end of the stroke of the wiper mechanism.

In testimony whereof we hereto affix our signatures.

ROBERT M. CRITCHFIELD.
JOHN W. LAWSON.